United States Patent
Kandler

(10) Patent No.: US 8,970,231 B2
(45) Date of Patent: *Mar. 3, 2015

(54) CAPACITIVE SENSOR ASSEMBLY

(75) Inventor: Marcus Kandler, Florssbachtal (DE)

(73) Assignee: Takata AG, Aschaffenburg (DE)

( * ) Notice: Subject to any disclaimer, the term of this patent is extended or adjusted under 35 U.S.C. 154(b) by 207 days.

This patent is subject to a terminal disclaimer.

(21) Appl. No.: 13/520,131

(22) PCT Filed: Dec. 30, 2010

(86) PCT No.: PCT/EP2010/070937
§ 371 (c)(1),
(2), (4) Date: Jun. 29, 2012

(87) PCT Pub. No.: WO2011/080323
PCT Pub. Date: Jul. 7, 2011

(65) Prior Publication Data
US 2013/0009654 A1    Jan. 10, 2013

(30) Foreign Application Priority Data

Dec. 30, 2009   (DE) .......................... 10 2009 055 424

(51) Int. Cl.
*G01R 27/26* (2006.01)
*B62D 1/04* (2006.01)
*B60N 2/00* (2006.01)
(Continued)

(52) U.S. Cl.
CPC .............. *B62D 1/046* (2013.01); *B60N 2/002* (2013.01); *B62D 1/065* (2013.01); *B60R 21/01532* (2014.10)
USPC ........................... 324/686; 324/660; 324/663

(58) Field of Classification Search
USPC .................................................. 324/660–686
IPC ....................................................... B60N 2/002
See application file for complete search history.

(56) References Cited

U.S. PATENT DOCUMENTS

| | | |
|---|---|---|
| 3,626,287 A | 12/1971 | Di Niro et al. |
| 6,158,768 A | 12/2000 | Steffens, Jr. et al. |
| 6,517,106 B1 | 2/2003 | Stanley et al. |

(Continued)

FOREIGN PATENT DOCUMENTS

| | | |
|---|---|---|
| CN | 101 108 595 A | 1/2008 |
| DE | 199 07 199 A1 | 11/1999 |

(Continued)

OTHER PUBLICATIONS

Office Action issued in corresponding Japanese Application No. 2012-546451 dated Jan. 30, 2014 and English translation of the same (11 pages).

(Continued)

*Primary Examiner* — Vincent Q Nguyen

(74) *Attorney, Agent, or Firm* — Fitch Even Tabin & Flannery LLP

(57) ABSTRACT

A capacitive sensor assembly for a motor vehicle for detecting seat occupancy is provided. The capacitive sensor assembly includes a capacitive sensor element which has at least one first electrical conductor element, and an electrical heating element which has at least one electrically operated heating conductor and which is interspaced from the first electrical conductor element. The first electrical conductor element is designed as an external conductor surrounding the heating conductor.

20 Claims, 5 Drawing Sheets

(51) Int. Cl.
*B62D 1/06* (2006.01)
*B60R 21/015* (2006.01)

(56) References Cited

U.S. PATENT DOCUMENTS

| | | | |
|---|---|---|---|
| 6,563,231 | B1 | 5/2003 | Stanley et al. |
| 6,703,845 | B2 | 3/2004 | Stanley et al. |
| 7,132,642 | B2 | 11/2006 | Shank et al. |
| 7,293,467 | B2 | 11/2007 | Shank et al. |
| 7,407,029 | B2 * | 8/2008 | Breed et al. ............ 180/274 |
| 2001/0045733 | A1 | 11/2001 | Stanley et al. |
| 2003/0005775 | A1 | 1/2003 | Washeleski et al. |
| 2003/0056600 | A1 | 3/2003 | Shank et al. |
| 2004/0113634 | A1 | 6/2004 | Stanley et al. |
| 2004/0267422 | A1 | 12/2004 | Bossler et al. |
| 2005/0242965 | A1 | 11/2005 | Rieth et al. |
| 2006/0022682 | A1 | 2/2006 | Nakamura et al. |
| 2007/0089527 | A1 | 4/2007 | Shank et al. |
| 2007/0117445 | A1 | 5/2007 | Yamamura et al. |
| 2007/0200721 | A1 | 8/2007 | Stanley et al. |
| 2007/0215601 | A1 | 9/2007 | Frank |
| 2007/0290532 | A1 | 12/2007 | Frank |
| 2008/0011732 | A1 | 1/2008 | Ito et al. |
| 2009/0199676 | A1 | 8/2009 | Kandler |
| 2010/0057304 | A1 | 3/2010 | Kandler |

FOREIGN PATENT DOCUMENTS

| | | |
|---|---|---|
| DE | 100 48 956 C1 | 5/2002 |
| DE | 203 09 877 U1 | 12/2003 |
| DE | 103 58 791 A1 | 8/2005 |
| DE | 103 58 793 A1 | 8/2005 |
| DE | 10 2006 008 919 A1 | 12/2006 |
| DE | 10 2006 031 207 B3 | 11/2007 |
| DE | 10 2007 022 463 A1 | 11/2008 |
| DE | 10 2007 024 141 A1 | 11/2008 |
| EP | 1 491 409 A1 | 12/2004 |
| EP | 1 301 800 B1 | 8/2006 |
| EP | 1 933 461 A1 | 6/2008 |
| FR | 2 868 999 A1 | 10/2005 |
| JP | S58-213313 A1 | 12/1983 |
| JP | S63-305074 A | 12/1988 |
| JP | S64-51564 U | 3/1989 |
| JP | H02-086085 A | 3/1990 |
| JP | SH05-291924 A1 | 11/1993 |
| JP | 2003-535341 A1 | 11/2003 |
| JP | 2005-502859 A1 | 1/2005 |
| JP | 2006-501388 A | 1/2006 |
| JP | 2007-123202 A | 5/2007 |
| JP | 2008-018789 A | 1/2008 |
| WO | 95/13204 A1 | 5/1995 |
| WO | 98/22836 A1 | 5/1998 |
| WO | 01/14171 A1 | 3/2001 |
| WO | 02/06083 A1 | 1/2002 |
| WO | 2004/022409 A2 | 3/2004 |

OTHER PUBLICATIONS

English translation of the International Preliminary Report on Patentability (Chapter I or Chapter II of the Patent Cooperation Treaty) from the International Bureau of WIPO for International Application No. PCT/EP2010/070937 dated Jul. 19, 2012, 7 pages.

English translation of Notification of the First Office Action issued in counterpart Chinese Application No. 201080040707.5 dated Apr. 28, 2013 (9 pages).

English translation of Notification of the First Office Action issued in counterpart Chinese Application No. 201080040635.4, dated Jun. 5, 2013 (10 pages).

Office Action issued in corresponding Japanese Application No. 2012-546452 dated Jun. 26, 2014 and English translation of the same (7 pages).

Office Action issued in corresponding Chinese Application No. 201080040635.4 dated Jul. 25, 2014 and English translation of the same (22 pages).

International Search Report from the International Bureau of WIPO for International Application No. PCT/EP2010/070937 dated Apr. 6, 2011 (3 pages) and an English translation of the same (3 pages).

Japanese Office Action dated Oct. 29, 2014 for JP 2012-546452 and English translation of the same. (5 pages).

* cited by examiner

CAPACITIVE SENSOR ASSEMBLY

CROSS-REFERENCE TO RELATED APPLICATIONS

This application is a National Phase Patent Application of International Patent Application Number PCT/EP2010/070937, filed on Dec. 30, 2010, which claims priority of German Patent Application Number 10 2009 055 424.6, filed on Dec. 30, 2009, which are hereby incorporated herein by reference in their entirety.

FIELD OF THE INVENTION

The invention relates to a capacitive sensor assembly for a motor vehicle.

BACKGROUND

Such a capacitive sensor assembly comprises at least one capacitive sensor element, which is formed by at least one (first) electrical conductor element as electrode and which is connected or to be connected to an evaluation unit, which determines and evaluates at least one measured value in dependency on the capacitive coupling of the capacitive sensor element to its surrounding, as well as at least one electrical heating element, which is formed by at least one electrically operated heating conductor and which is being spaced apart from the capacitive sensor element, thus in particular from the first electrical conductor element. The term conductor element is thereby in general being used for one or multi-part electrical conductive element, which can be for instance provided as a cable, flat conductor, electrical conductive film or in any form as an electrical conductive component (electrical conductive assembly).

The assigned evaluation unit can determine and evaluate in particular the change of a measured value (for instance a measured current) in dependency on the capacitive coupling of the capacitive sensor element to a reference potential, which can be defined by a suitable vehicle element, as for instance components of the vehicle body, components of a vehicle seat or the mentioned electrical heating element, wherein this capacitive coupling and thus said measured value is being influenced by the presence of a vehicle occupant or any other object in the surrounding of the capacitive sensor element. In case of a capacitive sensor element being integrated in a vehicle seat, for instance the presence of a vehicle occupant being located on the seat can be herewith determined and also the occupant's condition can be concluded or a child seat can be recognized.

It is known from U.S. Pat. No. 6,563,231 B1 to provide at least one electrical conductor element as electrode on a sensor mat for forming a capacitive sensor element. The sensor mat is arranged as an occupant detector on a vehicle part in order to determine the occupation of a specific seat of a motor vehicle with a vehicle occupant. Specifically, the sensor mat is being arranged with the electrical conductor element serving as a capacitive sensor element for instance on a seat area of a motor vehicle seat, and namely in particular between the seat cover and a seat cushion, thus approximately below the seat cover and above the seat cushion. In order to determine, if a vehicle occupant is located on a vehicle seat being equipped with such a detector, the capacity of the sensor mat and a carrier of a reference potential (zero potential) for instance defined by the vehicle floor ("earth") or by at least one reference conductor element integrated in the sensor mat is determined. This does have by no means necessarily to occur directly by a (direct) capacity measurement; rather it can occur by the measurement of any electrical values, which are linked to the mentioned capacity, wherein the respective measured value thereof depends on the capacity (between the sensor mat and a carrier of the reference potential), as for instance by the measurement of measured currents (in or to the electrical conductor element serving as capacitive sensor element), compare also DE 100 48 956 C1 in case of a capacitive sensor assembly being integrated into a steering wheel.

If a vehicle occupant is located on the corresponding vehicle seat then the resulting capacity is being influenced by the capacitive coupling of the occupant; and the resulting capacity corresponds to a combination (depending on the specific conditions for instance approximately a serial connection) of the capacity between the seat surface (or the capacitive sensor element provided there) and the vehicle occupant as well as the capacity between the vehicle occupant and the reference potential. By integrating thereby a reference conductor element with reference potential as counter electrode into the vehicle seat or into the sensor mat itself the distance between the carrier of the reference potential and the vehicle occupant to be detected can be reduced and through this the measuring sensitivity can be improved.

With such an arrangement it can also be differentiated if a vehicle occupant is located directly on the corresponding vehicle seat or if a child seat is provided on the vehicle seat, which in turn can accommodate a toddler. This assessment can be used in order to optionally deactivate one or more of the airbags assigned to the corresponding seat for instance when none-occupied or occupied with a child seat. Thus, a capacitive sensor assembly can be used as an occupant detector in order to activate or deactivate safety devices of a motor vehicle, but also for triggering other functions of a motor vehicle as for instance warning or controlling functions.

It is furthermore known from practice to arrange additionally an electrically operated heating conductors on a sensor mat beside the at least one electrical conductor element serving as a sensor element, wherein said heating conductors are being spaced apart from the first electrical conductor element and which produce under current heat for heating a steering wheel, a vehicle seat or any other vehicle part.

In case of capacitive sensor systems, which comprise beside a capacitive sensor element also at least one electrical heating element and/or at least one reference conductor element, the compliance of a defined distance between the (first) electrical conductor element forming the capacitive sensor element as well as the heating conductor forming the electrical heating element or the respective reference conductor element is of importance in order to be able to obtain reliable statements about the occupation of a seat with a vehicle occupant. The effect of humidity and moisture on the measured results is also in particular dependent on the distance between the sensor element and heating element or sensor element and reference conductor element,

SUMMARY

The object of the present invention is to provide a capacitive sensor assembly for a motor vehicle which avoids the previously mentioned disadvantages.

According to an exemplary embodiment of the invention the first electrical conductor element of the sensor assembly forming the capacitive sensor element is provided as (for instance longitudinal) external conductor and surrounds the heating conductor forming an electrical heating element (serving to heat a vehicle component) in form of an internal conductor (which continues in particular along the—optionally curved—extension direction of the external conductor).

Through this, a defined arrangement of a first electrical conductor element forming a capacitive sensor element in respect to a heating conductor forming a heating element is achieved in a simple manner, wherein the arrangement can either specifically be provided such that the distance between the first electrical conductor element (external conductor) and the heating conductor (internal conductor) remains always constant in operation, or can be provided such that in dependency on certain external conditions as for instance a pressure effect, defined changes of the distance are possible.

For providing defined conditions it can be in particular provided that the first conductor element completely surrounds the heating conductor in a cross-sectional plane of the sensor assembly, which intersects the first conductor element and the heating conductor (for instance essentially vertical in respect to the extension direction of first conductor element and heating conductor), that means surrounds it in form of a curve being closed in the cross-sectional plane.

For a comprehensive applicability of the sensor assembly, for instance being able not only to detect the presence of a person in the surrounding, but rather also to be able to provide statements about the constitution of the person or in order to be able to recognize a seat occupancy by a child seat, the heating conductor and the first conductor element can be separated from each other such that each arbitrary line, which extends in the cross sectional plane of the sensor assembly, which intersects the first conductor element and the heating conductor (for instance essentially vertical), can be brought independently on the spatial orientation of the line in the cross sectional plane into a position by parallel displacement in the cross sectional plane, in which it forms a curve secant of the first conductor element without intersecting the heating conductor.

The heating conductor/internal conductor can thereby serve further as a reference conductor element ("potential leading element"), which defines (as counter electrode to the first conductor element) a reference potential for (capacity) measurements.

According to a preferred exemplary embodiment of the invention the first electrical conductor element forms as an external conductor a longitudinal cover, in which the heating conductor extends as a (longitudinal) internal conductor. Such a design can in particular be realized according to the type of a shielded conductor or a coaxial cable with the heating conductor as cable core and the first conductor element as external cover.

The first conductor element in form of an external conductor can thereby—as well as optionally the heating conductor in form of an internal conductor—be formed by a cable network, an electrical conducting film or such.

According to an exemplary modification of the invention a further second conductor element continues between the first conductor element as external conductor and the heating conductor as internal conductor, wherein said second conductor element can serve in particular for shielding the first conductor element (external conductor) and the heating conductor (internal conductor) against each other. The second conductor element can here form a so called potential controlled shield ("driven shield"). Such a configuration can be in particular carried out according to the type of a three-axial cable or more generally, an n-axial cable.

The second (cover-like) conductor element continuing between the internal heating conductor and the external first conductor element can also be formed as a cable network, electrically conducting film or such.

Thereby, the heating conductor and the second conductor element are preferably spaced apart from each other such that any suitable line which extends in the cross-sectional plane of the sensor assembly, which intersects the first and the second conductor element as well as the heating conductor (for instance essentially vertical), can be brought independently on the spatial orientation of the lines in the cross-sectional plane by parallel displacement in the cross-sectional plane into a position in which it forms a curve secant of the second conductor element without intersecting the heating conductor. This corresponds to the distance, which has already been previously provided for the heating conductor and the first conductor element.

The heating conductor as internal conductor is advantageously surrounded by a dielectric, which can be formed by a gas, as for instance air, but also by a (insulating) solid body.

The dielectric can be compressed according to an exemplary variant by the effect of an external pressure such that the configuration of the sensor assembly can be changed directly pressure-dependent, what in turn influences the resulting capacity and allows conclusions about the pressure conditions in the area of the sensor assembly. A material can be used as a dielectric, which substantially deforms under an external pressure exceeding a certain minimal pressure, based on which for instance conclusions about the weight of a vehicle occupant can be drawn, who has taken a seat in a vehicle seat equipped with a sensor arrangement. Besides a differentiation between the heavier and lighter vehicle occupant, what can be of importance for the selection of a certain inflation behaviour of an airbag, hereby the differentiation between an occupancy with a child seat and a (little) vehicle occupant can in particular be supported.

The deformability of the dielectric can be location-independent according to an exemplary modification, for instance by using different materials in different areas for forming the dielectric surrounding the heating conductor.

According to a further exemplary variant of the invention a material is being used as dielectric, which at the pressures occurring in normal operation of the sensor assembly, that means for instance in case of a sensor arrangement being integrated into the vehicle seat at the pressures caused by the vehicle occupants, is not substantially deformable. Through this it is guaranteed that (capacity) measurements provide pressure independent results.

In order to protect the sensor assembly and in particular a dielectric surrounding the heating conductor from moisture a (insulating) protective cover can be provided, which covers at least the heating conductor as internal conductor (as well as optionally a dielectric surrounding the heating conductor). Such a protective cover can for instance continue between the first conductor element as external conductor and the heating conductor as internal conductor or also beyond the external conductor; said protective cover can, however, also continue (alternatively or additionally) on the outermost surface of the sensor assembly. The protective cover can be formed by an additional cover element or can be integrated directly into the arrangement for instance in form of an insulating lacquer.

The first conductor element can in particular be loaded with an alternating current (as measurement current) in order to allow reliable results also at moisture by evaluating the reality part, the imaginary part and/or the effective value of the current.

The sensor assembly according to the invention can be in particular part of a motor vehicle seat in order to recognize on the one hand a seat occupation as well as on the other hand to be able to heat the seat cushion; or it can be part of a steering wheel in order to determine on the one hand a hand rest of the vehicle driver on the steering wheel and on the other hand to be able to heat the steering wheel. Finally, said assembly can also be integrated in a safety belt system of a motor vehicle or in another vehicle component.

BRIEF DESCRIPTION OF THE DRAWINGS

Further details and advantages of the invention will become apparent with the following description of examples by the means of the Figures.

DETAILED DESCRIPTION

Figure 1:
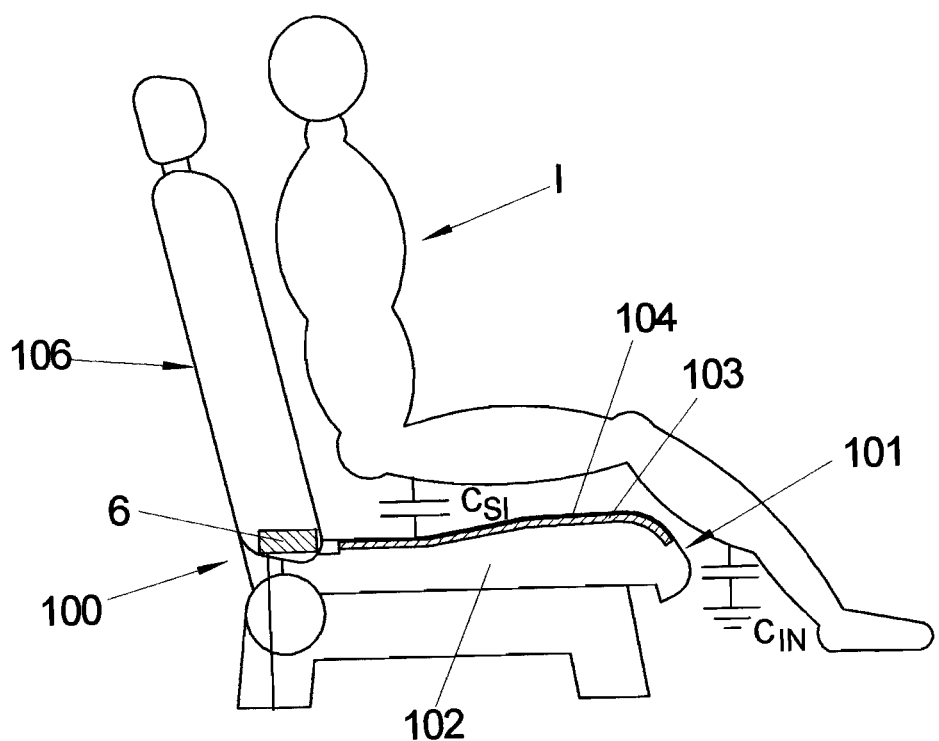
FIG. 1 shows schematic illustration of a motor vehicle seat with a sensor mat, which contains at least one capacitive sensor element.

FIG. 1 shows a motor vehicle seat 100, which comprises a seat cushion 101 provided on a seat under frame as well as a backrest 106 (foldable) hinged on the seat under frame, such that a vehicle occupant I being on the vehicle seat on the one hand sits on the seat cushion 101 and on the other hand can support its back on the backrest 106. The seat cushion 101 comprises for instance upholstery 102 and a cover 104, wherein here in the area of the seat surface of the seat cushion 101 between the seat upholstery 102 and the cover 104 a sensor mat 103 is arranged, which comprises at least a capacitive sensor element. A first electrical conductive element can be here integrated into the sensor mat, subsequently simply designated as first conductor element or as first electrical conductor, which forms an electrode of the capacitive sensor element and is connected with an evaluation unit 6 in order to be able to determine the capacity between the sensor mat 103, more precisely, the at least one capacitive sensor element (electrode) being arranged on the sensor mat 103, and a reference potential of the vehicle containing the vehicle seat 100.

The evaluation unit 6 can in turn interact with the (not shown) control device, which in dependency on the occupation of the vehicle seat with an occupant I and optionally in dependency on the size and the weight of the occupant as well as in dependency on the fact if the corresponding occupant sits directly on the vehicle seat 100 or if it is a toddler affiliated with a child seat, activates or deactivates safety devices assigned to the vehicle seat as for instance an air bag.

In case of the arrangement of the type shown in FIG. 1 the capacity between the sensor mat 103 and the reference potential is essentially determined by the combination of two capacities, namely the capacity CSI between the sensor mat 103 and the vehicle occupant I as well as the capacity CIN between the vehicle occupant and the reference potential. In respect to suitable possibilities for coupling the vehicle occupant I to the reference potential such that a in particular exact determination of the occupation of the vehicle seat 100 is possible as well as in respect to the (capacity) measurement it is pointed for further details to the U.S. Pat. No. 6,563,231 B1.

At present, the design of the electrical conductor is of particular importance, which forms the electrode of the sensor mat 103, to which the capacity measurements being required for the determination of the seat occupation relate.

According to the cross-sectional illustration of FIG. 2, a first electrical conductor being arranged as a part of a sensor mat 103 below a seat cover 104, which forms a capacitive sensor element or an electrode of a sensor mat, is carried out as an external conductor, which houses an electrical heating conductor 3 as internal conductor and surrounds said heating conductor cover-like (completely). The heating conductor 3 as internal conductor continues thereby longitudinally (vertical to the plane of FIG. 2) and the first conductor 1 forming the capacitive sensor element continues (as well vertical to the plane of FIG. 2) along the heating conductor 3. Precisely, the first conductor 1 as external conductor and the heating conductor 3 as internal conductor form according to the configuration of FIG. 2 an arrangement of the type of a shielded conductor, for instance a co-axial cable, with the internal conductor as cable core and the external conductor as external cover. The heating conductor 3 can thereby at present simultaneously be formed and provided (serving) as reference potential element, which (for instance instead of the vehicle floor often provided herefore) form (define) a reference potential (for capacity determination).

The heating conductor 3 and the first conductor 1 are spaced apart from each other such that any line g (as indicated by dashed line in FIG. 2), which extends in the cross-sectional plane of the sensor assembly, which intersects the first conductor 1 and the heating conductor 3, can be brought independent on the spatial orientation of the line g in cross-sectional plane by parallel displacement in the cross-sectional plane into a position, in which it forms a curve secant s of the first conductor 1 (thus connects two points of the first conductor 1 being spaced apart from each other in the cross-sectional plane to each other) without intersecting the heating conductor 3.

The heating conductor 3 is surrounded by an insulator or dielectric 4, which extends between the heating conductor 3 as internal conductor and the first conductor 1 as external conductor and is being surrounded in the embodiment towards the external first conductor 1 by a (moisture-tight) protective cover 5b. The heating conductor 3 serves for producing heat by energizing with electrical current such that through this, for instance the seat area of a seat cushion can be heated. The material of the dielectric 4 is selected thereby such that a sufficient part of the heat produced in the heating conductor 3 (can leave through the dielectric 4) is provided for heating the seat cushion 101.

The first conductor 1 being provided as a cover-like external conductor is adjacent (radially) outwards to the heating conductor 3 and the dielectric 4, here being surrounded by a protective cover 5b, wherein said first conductor is formed by a conductive material, at present in form of a cable network 11 or alternatively in form of an electric conductive film or a conductor path. The (moisture tight) protective cover 5a can also be provided on the external side of the external first conductor 1.

As a result, the capacitive sensor element (first conductor 1) and the occupant I or its body part facing the sensor element a first capacitor (with the capacity $C_{SI}$) and the occupant I as well as the element defining the reference potential (here the heating conductor 3) form a second capacitor (with the capacity $C_{IN}$) in the presence of an occupant I on the seat 100 of FIG. 1. The two capacitors are approximately connected in series.

The evaluation unit 6 is connected to the sensor assembly 1, 3 and can detect a measured value (for instance a measured current) or a change of a measured value as consequence of a capacitive coupling between the capacitive sensor elements (first conductor 1) and the reference potential (for instance defined by the heating conductor 3) caused by a vehicle occupant I. Specifically, for instance the strength, frequency, the amplitude and/or the phase of a measured current can be determined. It is being pointed to FIG. 4 and the assigned description for a possible concrete design of an evaluation unit 6.

In a modification, the dielectric 4 surrounding the heating conductor 3 as internal conductor is on the one hand designed sufficiently rigid such that it cannot be deformed under the forces or pressures occurring during normal operation of the sensor assembly. Forces and pressures occurring during normal operation are thereby in particular such which are applied by a vehicle occupant I sitting on the vehicle seat 100, compare FIG. 1. In this case the dielectric 4 provides that the (radial) distance between the first conductor 1 as external conductor and the heating conductor 3 as internal conductor remains always constant independent on the occupation of the corresponding vehicle seat such that the effect of force or pressure does not essentially influence the resulting capacity (when using the external conductor 1 as capacitive sensor element).

On the other hand there is a possibility to specifically select an (insulating) material for the dielectric 4, which deforms in dependency on the weight of a vehicle occupant sitting on the vehicle seat 100. Then, the material of the dielectric 4 can be for instance selected such that it is not being deformed by the effect of the weight of a child seat including a toddler located therein, but a substantial deformation occurs only at a force or pressure threshold, which is above the weight of a child seat with toddler and corresponds for instance to the weight of a small female occupant (so called 5% women).

Since a deformation of the dielectric 4 is accompanied by a change of the distance between the first conductor 1 as external conductor and the heating conductor 3 as internal conductor also the values of the capacities related to the first conductor 1 as capacitive sensor element are changed accordingly. As a result, the sensor assembly can be designed additionally as a pressure sensitive sensor (pressure sensor) by an appropriate selection of the dielectric 4 in order to obtain thereby additional information about a vehicle occupant residing on the assigned vehicle seat 100.

If necessary, a location dependent or direction dependent pressure sensitivity of the sensor assembly can be achieved by using different (insulating) materials for different areas 41, 42, 43, 44 of the dielectric 4. Depending on which areas 41, 42, 43, 44 of materials with comparatively large compressibility (comparable large compressibility or small compression module) as well as materials with comparatively small compressibility (comparatively small compressibility or large compression module) are used, it can be achieved that distance changes between the first conductor 1 as external conductor and the heating conductor 3 as internal conductor depend on the location and/or the direction of the force attacking the sensor assembly.

Thereby, it can also be provided that a material is used as dielectric, which reacts with a certain timely delay (by deformation) to a pressure effect, such that by time dependent measurements of the capacity or measured values connected therewith (thus depending on the capacity) the influence of pressure can be watched, evaluated and considered. A suitable selected reaction delay allows in particular a phase-wise measurement, wherein at first (before the delayed deformation of the dielectric as consequence of a force applied) purely capacitive coupling changes—as consequence of an occupation of the seat—can be recorded and subsequently (during or after deformation of the dielectric) the influence of a deformation of the dielectric on the capacitive coupling is being recorded, whereby additional data for the detection of the seat occupation as well as the differentiation between the different large/heavy vehicle occupants are provided.

The material of the dielectric 4 can be selected such that it expands or contracts by temperature changes, thus by a change of the surrounding temperature and/or by a change of the temperature produced by the heating conductor 3—in dependency if a temperature increase or a temperature decrease is present—such that the distances between the components of the sensor assembly, in particular between the external, first conductor 1 serving as a capacitive sensor element and the heating conductor 3 (advantageously simultaneously defining a reference potential) change. The effects connected herewith on the capacity being detected at the given conditions (occupation or non-occupation of the seat as well as optionally constitution of an occupant occupying the seat) allow conclusions about the surrounding temperature or—when operating the heating conductor 3—the temperature produced by the heating conductor 3. Devices of a motor vehicle, such as for instance the heating device itself or an air-handling unit, can herewith be controlled or regulated on the one hand and on the other hand temperature influences on the sensor assembly can be appropriately considered.

Figure 2:
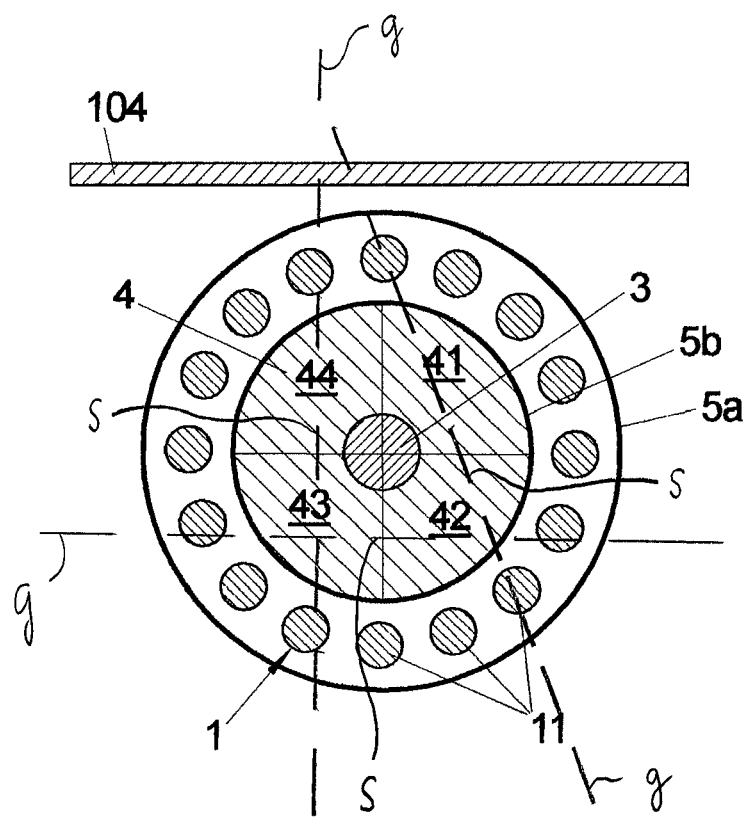
FIG. 2 shows a first embodiment of an electrical conductor for forming a capacitive sensor element.
Figure 3:
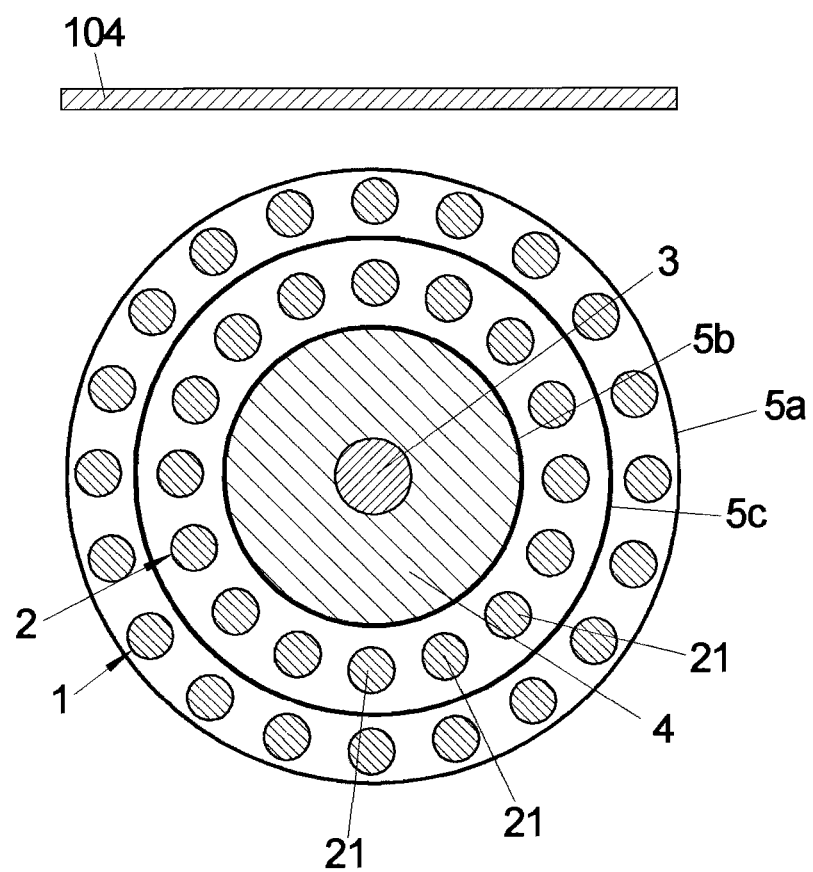
FIG. 3 shows a second embodiment of an electrical conductor for forming a capacitive sensor element.

FIG. 3 shows a modification of the sensor assembly of FIG. 2 according to which an additional second conductor extends between the first conductor 1 as external conductor and the heating conductor 3 as internal conductor, wherein said second conductor is here (likewise) formed as a cable network 21 and surrounds the heating conductor 3 and the dielectric 4 like a cover. Through this, the first conductor 1 in form of an external conductor serving as a capacitive sensor element can be shielded against the heating conductor 3 in form of an internal conductor such that distance changes between the first conductor 1 and the heating conductor 3 do not have any substantial repercussion on the resulting capacity. The shield formed by the second conductor 2 can be thereby formed as a so-called potential controlled shield ("driven shield").

Furthermore, a further (optionally moisture-tight) protective cover 5c can continue between the first conductor 1 and the second conductor 2. In practice, depending on the requirements one or multiple of the total of three protective covers 5a, 5b, 5c shown in FIG. 3 can be provided.

In summary, the sensor assembly according to FIG. 3 is formed according to the type of a three-axial cable with the heating conductor 3 as cable core, the first conductor 1 as external cover and the second conductor 2 as a centre cover, which encloses the heating conductor 3/cable core and which is in turn enclosed by the external cover formed by the first conductor 1.

Figure 4:
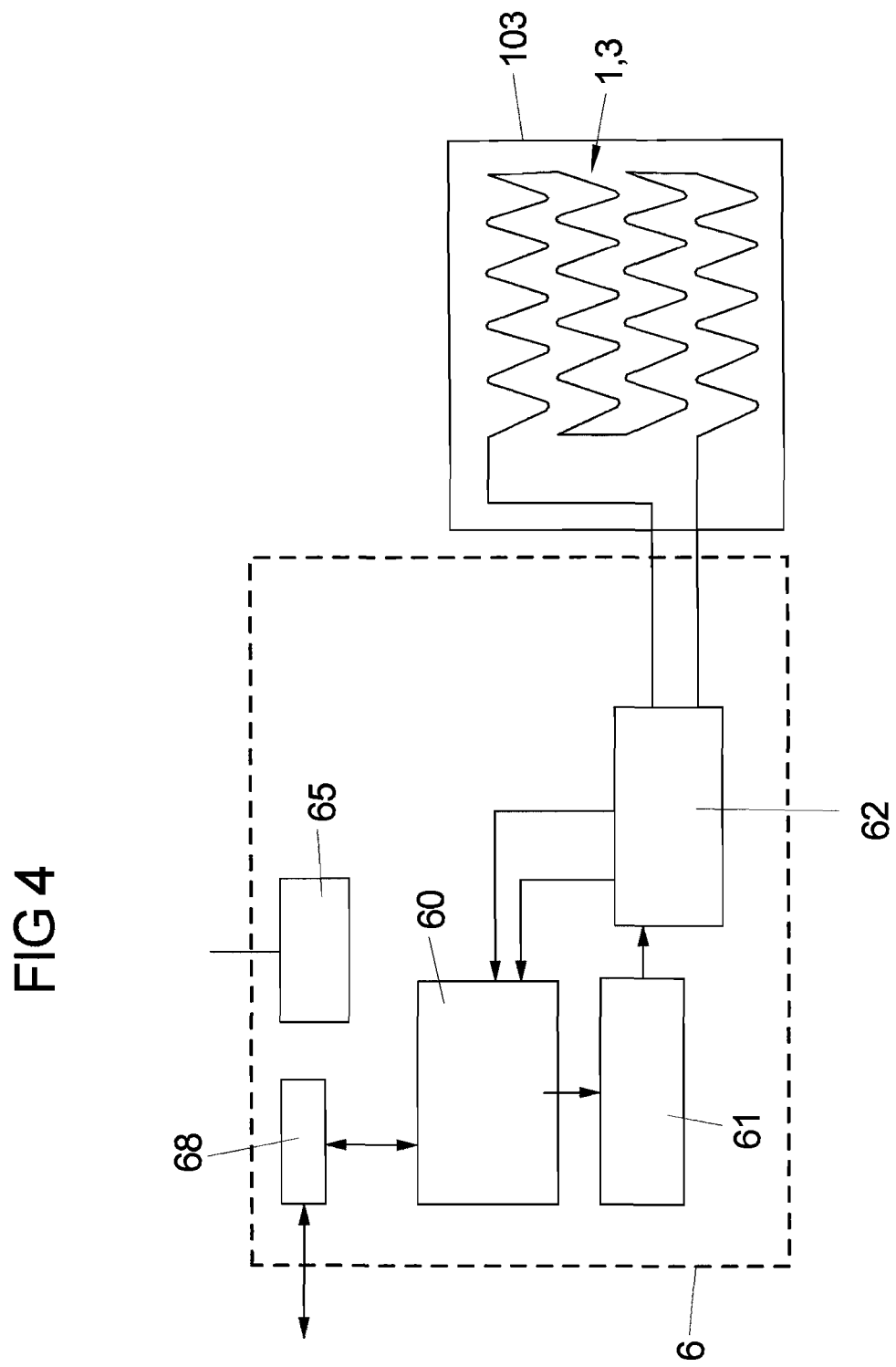
FIG. 4 shows a capacitive sensor element together with an evaluation unit assigned thereto.

FIG. 4 shows a sensor assembly 1, 3 of a type illustrated in cross-section in FIG. 2 or 3 as part of a sensor mat 103 together with a subordinated evaluation unit 6 for evaluating the exit signal generated by the sensor assembly 1, 3.

The evaluation unit 6 can serve on the one hand to detect in a simple manner the capacity of the sensor mat 103 in respect to the reference potential, which is determined by occupation of the corresponding vehicle seat 100 with a vehicle occupant I, compare FIG. 1, by the interconnection (for instance connection in series) of the capacity $C_{SI}$ between the sensor mat 103 and the vehicle occupant I as well as the capacity $C_{IN}$ between the vehicle occupant I and the reference potential.

According to the concrete arrangement shown in FIG. 4, the first conductor 1 (external conductor) of the sensor assembly is provided as capacitive sensor element with an alternating current, for instance a sinus signal of a defined frequency of about 120 kHz. For this reason, an energy supply device 65 is assigned to the evaluation limit 6; and a (sinus-like) alternating current with a defined phase and amplitude is generated in a signal generating device 61 and is supplied to the sensor mat 103 or the sensor assembly 1, 3 (more precise to the at least one external conductor 1 forming a capacitive sensor element). The generation of said sinus signal can be controlled by a microprocessor 60 of the evaluation unit 6.

By means of a measuring device 62, which is integrated intro an electrical connecting line affiliated to the sensor assembly 1, 3 and which is located in the embodiment between the signal generation device 61 and the sensor assembly 1, 3 or the sensor mat 103, the actually applied alternating current is measured and the measured result is supplied to the microprocessor 60 of the evaluation unit 6. By comparing the parameters of the alternating current generated in the signal generation device 61, as for instance amplitude and phase, to the corresponding parameters actually measured at the measuring device 62, thus for instance amplitude and phase, deviations of said parameters caused by the sensor mat 103 or sensor assembly 1, 3 and its capacitive interaction with the surrounding (for instance with a vehicle occupant) can be determined.

For this reason, for instance the active current part (thus the part or real share of the alternating current being in phase with the underlying alternating voltage), in particular as basis for determining a phase shift, and/or a reactive current share (imaginary part of the alternating current) and/or the quadrature share or effective value of the current, in particular as basis for determining the amplitude, is determined.

It can be in particular concluded from amplitude deviations to capacities of the sensor assembly in respect to a reference potential ("reference potential") and it can be concluded from deviations of the phase to possible leakage currents, which are caused by moisture or humidity in the seat.

Hereby, when evaluating measured capacities or measured values being related thereto for determining the occupation of a seat, for instance for differentiating the status "non-occupied", "directly occupied by a vehicle occupant" as well as "occupied by a toddler being in a child seat" moisture and humidity in the seat can be additionally considered, preventing erroneous interpretations of the measured results in respect to the seat occupation.

The information obtained about the seat occupancy can be transferred via an interface 68 to a control device in order to control depending thereof vehicle systems, in particular occupant safety systems as for instance an airbag system.

Figure 5:
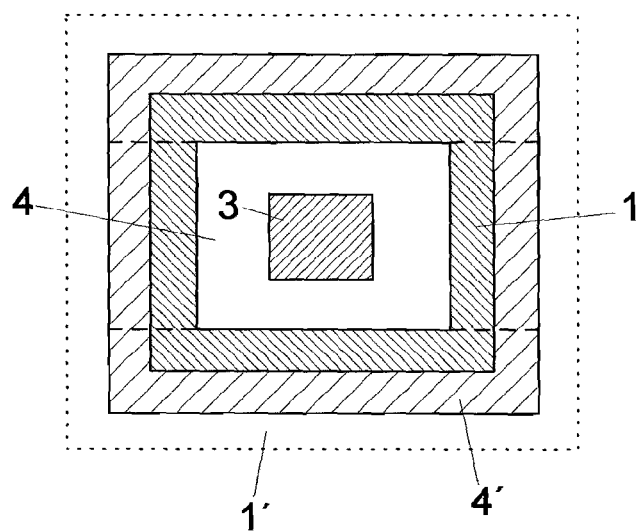
FIG. 5 shows a third embodiment of an electrical conductor for forming a capacitive sensor element.

FIG. 5 shows a capacitive sensor assembly, which comprises a capacitive sensor element 1 in form of an external conductor, which encloses a (optionally serving as reference potential element) heating conductor 3 as an internal conductor in the cross-section, wherein between the heating conductor 3 as internal conductor and the capacitive sensor element 1 as external conductor a dielectric extends. The arrangement shown in FIG. 5, in particular its first conductor 1 as external conductor as well as the heating conductor 3 and the dielectric 4, extend thereby vertical to the plane of FIG. 5.

The arrangement corresponds in so far to the principle construction of the arrangement of FIG. 2 with the difference that at present it is a system made of layers, which—according to the type of a flat conductor—consists of multiple layers being applied on each other (for instance laminated), as being explained in more detail in the following.

It is further more indicated in FIG. 5 that the arrangement of the external, first conductor 1, the internal heating conductor 3 as well as the dielectric 4 located there between can be enclosed on the outside by a further dielectric 4', to which again a electrical conductive element 1' can be adjacent and so on. Thus, basically electrical 1, 1', . . . can be adjacent to one another outwards n-times, wherein said conductors can be separated from each other in each case by a suitable insulating layer.

Interfaces between layers being arranged on each other (laminated on each other) are exemplarily indicated by doted line in FIG. 5, wherein said layers form the sensors assemble of FIG. 5.

Figure 6:
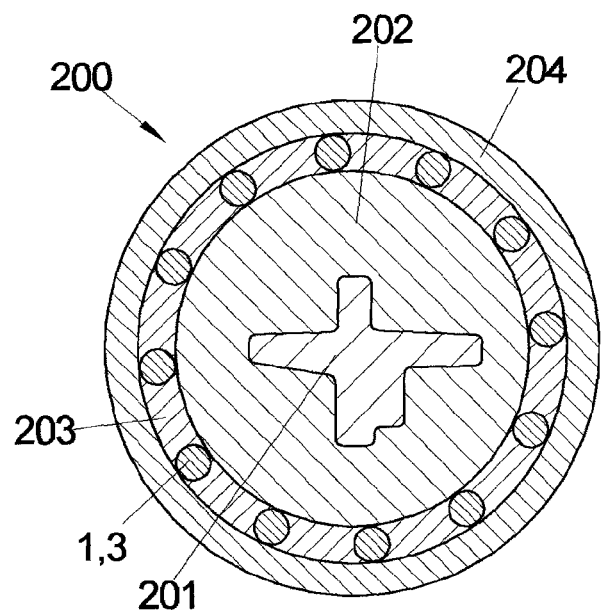
FIG. 6 shows a schematic cross-section through a motor vehicle steering wheel with capacitive sensor element.

FIG. 6 shows finally a cross-section through a steering wheel 200 in the area of the steering wheel rim with a capacitive sensor assembly 302 being arranged there.

According to FIG. 6, the steering wheel 200 comprises in the area of the rim a skeleton 201 being surrounded by a cover 202, for instance a steering wheel foam, and being surrounded by a cover 204, for instance of leather, defining the outer surface of the steering wheel rim. The capacitive sensor assembly 3 is arranged beyond the cover 202, but beneath the outer surface (defined by the cover 204), wherein said sensor assemble comprises a number of arrangements 1, 3 of the type shown in the FIG. 2 or 3 or 5, thus in each case a capacitive element designed as an external conductor and a heating conductor/reference potential element as internal conductor.

The invention claimed is:

1. A capacitive sensor assembly for a motor vehicle comprising:
    a capacitive sensor element, which comprises at least one first electrical conductor element, the capacitive sensor element being configured to be connected to an evaluation unit, which detects and evaluates at least one measured value in dependency on the capacitive coupling of the capacitive sensor element to the surrounding, and
    an electrical heating element, which comprises at least one electrically operated heating conductor and which is spaced apart from the first electrical conductor element,
    wherein the first electrical conductor element is designed as an external conductor element which surrounds the heating conductor as an internal conductor, and
    wherein a second conductor element extends between the first conductor element as the external conductor element and the heating conductor as the internal conductor.

2. The sensor assembly according to claim 1, wherein the first conductor element completely surrounds the heating conductor as viewed in a cross-sectional plane of the sensor assembly, which extends perpendicular to and intersects the first conductor element and the heating conductor.

3. The sensor assembly according to claim 2, wherein the first conductor element surrounds the heating conductor in the cross-sectional plane of the sensor assembly, which extends perpendicular to and intersects the first conductor element and the heating conductor, as a closed curve.

4. The sensor assembly according to claim 1, wherein the heating conductor and the first conductor element are spaced from each other as viewed in a cross-sectional plane of the capacitive sensor assembly that extends perpendicular to and intersects the first conductor element and the reference conductor element such that a line, which intersects the first conductor element and the heating conductor, is shiftable independently of the spatial orientation of the line in the cross sectional plane by parallel displacement in the cross-sectional plane in a direction orthogonal to the straight line into a position, in which said line forms a curve secant of the first conductor element without intersecting the heating conductor.

5. The sensor assembly according to claim 1, wherein the first conductor element as an external conductor element and the heating conductor as an internal conductor form a coaxial cable design.

6. The sensor assembly according to claim 1, wherein the first conductor element as an external conductor element and the heating conductor as an internal conductor form a shielded cable design.

7. The sensor assembly according to claim 1, wherein the second conductor element shields the first conductor element and the heating conductor against each other.

8. The sensor assembly according to claim 7, wherein the dielectric is compressible under pressure.

9. The sensor assembly according to claim 8, wherein the sensor mat serves as a heating mat for heating at least one vehicle component.

10. The sensor assembly according to claim 1, wherein the second conductor element is provided as a potential controlled shield.

11. The sensor assembly according claim 1, wherein the first and the second conductor element as well as the heating conductor form an n-axial cable design.

12. The sensor assembly according to claim 1 wherein the heating conductor is at least partially surrounded by a dielectric.

13. The sensor assembly according to claim 1, wherein the heating conductor as a potential carrying element defines a reference potential.

14. The sensor assembly according to claim 1, wherein the first conductor is supplied with an alternating current and a measuring device for determining parameters of the alternating current is provided in order to determine the effect of the sensor assembly on the alternating current.

15. The sensor assembly according to claim 1, wherein the sensor assembly is part of a sensor mat.

16. The sensor assembly according to claim 1, wherein the sensor assembly forms furthermore a temperature sensor.

17. The sensor assembly according to claim 1, wherein the sensor assembly is designed and provided for assembly into a motor vehicle part in order to recognize herewith the presence of a vehicle occupant in a specific seat.

18. The sensor assembly according to claim 1, wherein the sensor assembly is designed and provided for assembly into a motor vehicle seat and/or a steering wheel and/or a safety belt system.

19. A motor vehicle seat with a seat frame, at least one seat cushion provided at the seat frame and a sensor assembly according to claim 1, which serves for recognizing the seat occupancy as well as for heating the seat cushion.

20. A motor vehicle steering wheel with a steering wheel body and at least one sensor assembly according to claim 1 provided at the steering wheel body, which serves for recognizing the hand rest of a vehicle driver on the steering wheel as well as for heating the steering wheel.

* * * * *